United States Patent
Jørgensen

(10) Patent No.: US 10,252,256 B2
(45) Date of Patent: Apr. 9, 2019

(54) PREPARATION METHOD OF A NON-WOVEN FIBROUS MATERIAL-BASED HONEYCOMB CATALYST

(71) Applicant: Umicore AG & Co. KG, Hanau-Wolfgang (DE)

(72) Inventor: Claus S. Jørgensen, Virum (DK)

(73) Assignee: Umicore AG & Co. KG, Hanau-Wolfgang (DE)

(*) Notice: Subject to any disclaimer, the term of this patent is extended or adjusted under 35 U.S.C. 154(b) by 0 days.

(21) Appl. No.: 16/079,158

(22) PCT Filed: Mar. 2, 2017

(86) PCT No.: PCT/EP2017/054883
§ 371 (c)(1),
(2) Date: Aug. 23, 2018

(87) PCT Pub. No.: WO2017/153239
PCT Pub. Date: Sep. 14, 2017

(65) Prior Publication Data
US 2018/0353947 A1  Dec. 13, 2018

(30) Foreign Application Priority Data

Mar. 9, 2016 (DK) .................... 2016 00145
Jun. 30, 2016 (DK) .................... 2016 00389

(51) Int. Cl.
*B01J 29/06* (2006.01)
*B01J 35/04* (2006.01)
(Continued)

(52) U.S. Cl.
CPC ............. *B01J 35/04* (2013.01); *B01D 53/88* (2013.01); *B01D 53/9418* (2013.01);
(Continued)

(58) Field of Classification Search
CPC ........ B01J 35/04; B01J 37/08; B01J 37/0244; B01J 21/063; B01J 21/16; B01J 29/04;
(Continued)

(56) References Cited

U.S. PATENT DOCUMENTS 3,395,071 A * 7/1968 Nitzsche ................ D21H 13/42
162/155
5,194,414 A 3/1993 Toshimi et al.
(Continued)

FOREIGN PATENT DOCUMENTS

EP 1195196 A1 4/2002
EP 2373405 B1 10/2011

OTHER PUBLICATIONS

Wallenberger et al. "Glass Fibers" ASM Handbook, vol. 21: Composites (#06781G) (Year: 2001).*
(Continued)

*Primary Examiner* — Haytham Soliman
(74) *Attorney, Agent, or Firm* — Suzannah K. Sundby, Esq.; Canady + Lortz LLP

(57) ABSTRACT

Method for the preparation of a honeycomb catalyst including the steps of pre-coating a non-woven fibrous sheet, corrugating the fibrous sheet and rolling-up or stacking-up the corrugated sheet to form a honeycomb body. The honeycomb body is subsequently washcoated, including the addition of at least one catalytically active compound.

13 Claims, 1 Drawing Sheet

(51) Int. Cl.
  *B01J 37/02* (2006.01)
  *B01J 23/22* (2006.01)
  *B01J 23/28* (2006.01)
  *B01J 23/30* (2006.01)
  *B01J 23/42* (2006.01)
  *B01J 23/44* (2006.01)
  *B01J 23/64* (2006.01)
  *B01D 53/94* (2006.01)
  *B01J 29/00* (2006.01)
  *B01J 35/06* (2006.01)
  *B01J 37/00* (2006.01)
  *B01D 53/88* (2006.01)
  *B01J 21/06* (2006.01)
  *B01J 21/16* (2006.01)
  *B01J 29/04* (2006.01)
  *B01J 37/08* (2006.01)

(52) U.S. Cl.
  CPC ............ *B01J 21/063* (2013.01); *B01J 21/16* (2013.01); *B01J 23/22* (2013.01); *B01J 23/28* (2013.01); *B01J 23/30* (2013.01); *B01J 23/42* (2013.01); *B01J 23/44* (2013.01); *B01J 23/64* (2013.01); *B01J 29/00* (2013.01); *B01J 29/04* (2013.01); *B01J 35/06* (2013.01); *B01J 37/0009* (2013.01); *B01J 37/0018* (2013.01); *B01J 37/0201* (2013.01); *B01J 37/0217* (2013.01); *B01J 37/0219* (2013.01); *B01J 37/0228* (2013.01); *B01J 37/0236* (2013.01); *B01J 37/0242* (2013.01); *B01J 37/0244* (2013.01); *B01J 37/0246* (2013.01); *B01J 37/08* (2013.01); *B01D 2251/2062* (2013.01); *B01D 2255/1021* (2013.01); *B01D 2255/1023* (2013.01); *B01D 2255/20723* (2013.01); *B01D 2255/20769* (2013.01); *B01D 2255/20776* (2013.01); *B01D 2255/50* (2013.01)

(58) Field of Classification Search
  CPC ............... B01J 37/0228; B01J 37/0236; B01J 37/0201; B01J 37/0219; B01J 23/22; B01J 23/28; B01J 23/30; B01J 23/42; B01J 37/0217; B01J 37/0242; B01J 37/0018; B01J 37/0009; B01J 35/06; B01J 37/0246; B01J 29/00; B01J 23/64; B01J 23/44; B01D 53/88; B01D 53/9418; B01D 2255/20769; B01D 2251/2062; B01D 2255/1021; B01D 2255/1023; B01D 2255/20723; B01D 2255/20776; B01D 2255/50
  USPC .......................................................... 502/68
  See application file for complete search history.

(56) References Cited

U.S. PATENT DOCUMENTS

2007/0122330 A1* 5/2007 Noh ................... B01D 53/8628
                                                                 423/239.1
2009/0025553 A1  1/2009 Keefer et al.
2011/0217221 A1  9/2011 Thogersen
2015/0151293 A1  6/2015 Lemus-Yegres et al.

OTHER PUBLICATIONS

International Search Report received in PCT/EP2017/054883 dated May 15, 2017.
Written Opinion received in PCT/EP2017/054883 dated May 15, 2017.

* cited by examiner

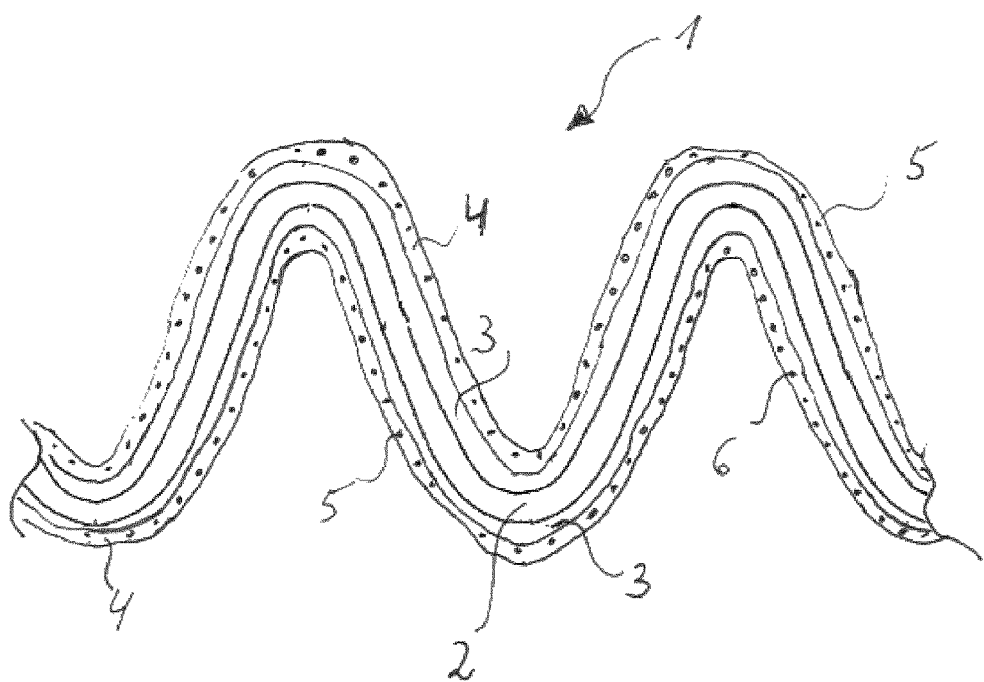

PREPARATION METHOD OF A NON-WOVEN FIBROUS MATERIAL-BASED HONEYCOMB CATALYST

The present invention relates to a method of preparing a honeycomb shaped catalyst formed of a corrugated substrate composed of a non-woven fibrous material.

In particular, the invention provides an improved honeycomb shaped catalyst prepared from corrugated sheets of a non-woven fibrous material, preferably provided with a flat liner.

We have found that a stable honeycomb shaped catalyst can be made of non-woven fibrous material, for instance E-glass fibers as starting material, when coating the material with a pre-coat layer prior to corrugating and forming the fibrous material into a corrugated sheet. The forming process can comprise heating and or humidification of the precoated fibrous material. The pre-coat layer is applied as an aqueous suspension of ceramic material.

We have additionally found that when the pre-coat layer is applied on the substrate in an amount resulting in a total weight of substrate and coat layer of between 60-120 g/m$^2$ results in an improved stability and stiffness of the paper so that waves formed in the corrugation process substantially retain their shape in subsequent forming stages of the final honeycomb catalyst product and operation of the honeycomb catalyst product.

Pursuant to the above finding, this invention provides a method for the preparation of a honeycomb catalyst comprising the steps of (a) providing a substrate in form of one or more sheets of non-woven fibrous material;

(b) pre-coating the substrate with an aqueous pre-coat suspension comprising ceramic material and one or more binders in an amount resulting in total weight of the substrate and first coat of between 60 and 120 g/m$^2$;

(c) corrugating the pre-coated substrate;

(d) rolling-up or stacking up the pre-coated and corrugated substrate into a spiral-wound cylindrical body or a staked up rectangular body;

(e) washcoating the cylindrical or rectangular body of step (d) with a catalyst carrier washcoat, containing one or more catalytic active components or precursors thereof; and (f) drying and optionally calcining the washcoated body of step (e); or alternatively (g) washcoating the cylindrical or rectangular body of step (d) with a catalyst carrier washcoat and impregnating the washcoated body with a solution of the one or more catalytic active components or precursors thereof; and (h) drying and calcining the wash coated body of step (g). Preferably, the pre-coated and corrugated substrate of step (c) is provided with a flat liner prior to step (d).

In such an embodiment of the invention, the flat liner is pre-coated with the aqueous pre-coat suspension in an amount resulting in total weight of the liner and pre-coat of between 60 and 120 g/m$^2$, prior to being provided on the corrugated and pre-coated substrate.

Presently, non-woven fibrous materials comprising glass fibers are preferred.

Preferred ceramic materials for use in the aqueous pre-coat suspension comprise at least one of kaolin, clay materials, magnesium-aluminum silicates, ball clay, or bentonite.

Binders and plasticizers used in the pre-coat material comprise one or more polymeric compounds, such as polyvinyl acetate, polyvinyl alcohols, polyacrylate, cellulose ethers, polysaccharides, polyglycols, natural gums, like xanthan gum and gum Arabic.

The binders employed in the pre-coat improve plasticity, shape ability and shape stability of the substrate in the corrugation process and at the same time make the pre-coated and corrugated substrate resistant against organic solvents used in the subsequent coating with the catalyst carrier washcoat.

A preferred pre-coat suspension comprises kaolin and polyvinyl acetate suspended in water with a total solid content of 15-60 wt %.

The pre-coat can be applied on one side of the sheet or on both sides of the sheet(s) and the optional liners.

In both coating methods, the pre-coat slurry penetrates the sheet(s).

A honeycomb body is formed by stacking up a plurality of the pre-coated and corrugated sheets, or by rolling-up a single pre-coated and corrugated sheet, preferably lined with a flat liner, into a rectangular or cylindrical honeycomb body.

In each case the formed honeycomb body has a plurality of parallel flow through channels formed by waves of the corrugated sheet(s) and the optional liner applied on the corrugated sheet(s).

The thus formed honeycomb body is subsequently washcoated with a washcoat containing the catalyst carrier material.

The catalyst carrier material is selected from at least one of alumina, titania, silica, and mixtures thereof. Preferably, the carrier washcoat comprises titania.

The catalyst carrier washcoat contains preferably one or more organic solvents, preferably comprising butanol, isobutanol, ethanol, propanol, isopropanol and aromatic solvents.

Washcoating of the honeycomb body is usually performed by slurry pickup in the honeycomb body pre-coated with the first coat by pouring the washcoat slurry into the channels of the honeycomb body, or by dipping the body at one side into the washcoat slurry and optionally applying vacuum at the opposite side.

There are two suitable methods of catalysing the honeycomb body.

In one method the washcoat contains the catalytic active material.

In the other method, the pre-coated and washcoated honeycomb body is finally impregnated with an aqueous solution containing one or more precursors of the desired catalytically active material, followed by drying and calcination.

Honeycomb catalysts are typically employed in the cleaning of engine exhaust gas. For this purpose the honeycomb catalyst is shaped as a cylindrical body and canned in a metal housing with a mat between the honeycomb catalyst body and the metallic housing. In the canning process the cylindrical honeycomb body is radially compressed in order to provide sufficient friction between the mat and the body and between the mat and the metallic housing. Radially compression typically causes cracks in the coated and calcined body. Thus, a further advantage of the pre-coat provided on the substrate is that the canning process causes a much reduced cracking of the honeycomb body.

The canned honeycomb catalyst is as mentioned above typically used in the catalytically removal of noxious compounds in the exhaust gas, including nitrogen oxides, unburnt engine fuel and carbon monoxide.

Thus, it is preferred that the catalytically active compounds of the honeycomb catalyst are active in the removal of noxious compounds in engine exhaust gas.

Catalyst compounds active in engine exhaust gas cleaning are per se known in the art. To name a few, typically employed catalysts are vanadium oxide, tungsten oxide, palladium and platinum, and zeolitic material either used alone or as mixtures thereof.

When operating the honeycomb shaped catalyst in the removal of nitrogen oxides contained in exhaust or off-gasses, the nitrogen oxides are converted to free nitrogen with a reducing agent, typically ammonia, in the presence of an SCR catalyst by selective, catalytic reduction:

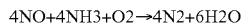

Any of the known SCR catalyst compositions will be suitable for use in the invention.

FIG. 1 of the drawings is a sectional view of a honeycomb catalyst according to the invention.

As seen in FIG. 1, the substrate 1 of a honeycomb catalyst according to the invention is composed of a corrugated sheet 2 of non-woven fibrous material substrate, optionally provided with a liner (not shown). Substrate 1 can be rolled-up to a cylindrical body.

A pre-coat coat layer 3 made of ceramic material is coated on sheet 2. The pre-coat material can also diffuse through the fibrous material of sheet 2 and forms a pre-coat layer on both sides of sheet 2 and within the fibrous material, as shown in FIG. 1. A washcoat layer 4 is coated on the pre-coat layer 3. Washcoat layer 4 contains catalyst particles 5. Catalyst particles 5 can additionally be present in the pre-coat layer 3 (not shown in the FIGURE).

The invention claimed is:

1. A method for the preparation of a substrate having a catalytic active component or precursor thereon comprising the steps of
   (a) providing a substrate in form of one or more sheets of non-woven fibrous material;
   (b) pre-coating the substrate with an aqueous pre-coat suspension comprising ceramic material and one or more binders in an amount resulting in total weight of the substrate and pre-coat of between 60 and 120 g/m$^2$;
   (c) corrugating the pre-coated substrate;
   (d) rolling-up or stacking up the pre-coated and corrugated substrate into a spiral-wound cylindrical body or a staked up rectangular body;
   (e) washcoating the cylindrical or rectangular body of step (d) with a catalyst carrier washcoat, containing one or more catalytic active components or precursors thereof; and
   (f) drying and optionally calcining the washcoated body of step (e); or alternatively
   (g) washcoating the cylindrical or rectangular body of step (d) with a catalyst carrier washcoat and impregnating the washcoated body with a solution of the one or more catalytic active components or precursors thereof; and
   (h) drying and calcining the wash coated body of step (g).

2. The method of claim 1, wherein the non-woven fibrous material comprises glass fibers.

3. The method of claim 1, wherein the ceramic material in the aqueous pre-coat suspension comprises at least one of kaolin, clay materials, magnesium-aluminum silicates, ball clay, or bentonite.

4. The method of claim 1, wherein the one or more binders in the aqueous pre-coat suspension comprises one or more polymeric compounds, polyvinyl acetate, polyvinyl alcohols, polyacrylate, cellulose ethers, polysaccharides, polyglycols, natural gums, xanthan gum, or gum Arabic.

5. The method of claim 1, wherein the aqueous pre-coat suspension comprises kaolin and polyvinyl acetate suspended in water with a total solid content of 15-60 wt %.

6. The method of claim 1, wherein the catalyst carrier comprises alumina, titania, silica, or a mixture of two or more thereof.

7. The method of claim 6, wherein the catalyst carrier comprises titania.

8. The method of claim 1, wherein catalyst carrier washcoat contains one or more organic solvents.

9. The method of claim 8, wherein the one or more organic solvents comprise butanol, isobutanol, ethanol, propanol, isopropanol, or an aromatic solvent.

10. The method of claim 1, wherein the one or more catalytically active compounds are active in the removal of noxious compounds in engine exhaust gas.

11. The method according to claim 10, wherein the one or more catalytically active compounds comprise vanadium oxide, tungsten oxide, molybdenum oxide, zeolitic material, platinum, or palladium.

12. The method of claim 1, wherein the precoated and corrugated substrate of step (c) is provided with a flat liner prior to step (d).

13. The method according to claim 12, wherein the flat liner is pre-coated with the aqueous pre-coat suspension in an amount resulting in total weight of the liner and pre-coat of between 60 and 120 g/m$^2$, prior to being provided on the corrugated and pre-coated substrate.

* * * * *